United States Patent [19]
Montana

[11] 3,944,801
[45] Mar. 16, 1976

[54] METHOD AND APPARATUS FOR AUTOMATIC SALES TAX COMPUTATION

[75] Inventor: Richard L. Montana, Stanhope, N.J.

[73] Assignee: Digital Computer Controls, Inc., Fairfield, N.J.

[22] Filed: Sept. 3, 1974

[21] Appl. No.: 502,853

[52] U.S. Cl. .................. 235/156; 340/172.5; 444/1
[51] Int. Cl.² ......................................... G06F 15/20
[58] Field of Search .............. 235/61 A, 61 M, 156; 340/172.5; 444/1

[56] References Cited
UNITED STATES PATENTS

| | | | |
|---|---|---|---|
| 3,253,132 | 5/1966 | Pendleton | 235/156 X |
| 3,281,794 | 10/1966 | Townsend | 340/172.5 |
| 3,294,960 | 12/1966 | Townsend | 235/156 X |
| 3,598,973 | 8/1971 | Brooks et al. | 235/156 X |

OTHER PUBLICATIONS
Intel Corp., Data Catalog, Oct. 1973, pp. 6–27, 6–28.

*Primary Examiner*—R. Stephen Dildine, Jr.
*Attorney, Agent, or Firm*—Stephen E. Feldman

[57] ABSTRACT

A device is provided for the exact automatic computation of sales tax rather than calculation of tax as a percentage. In the disclosure, a first subset of tax cutoff values and a second subset of repeating increments of values, corresponding to repeating increments of tax, are stored in a memory. The amount on which the tax is to be calculated is entered into a register and compared in a CPU to the total vlaue of the first subset. The CPU provides a zero output to a register when the amount is less than the first subset. When the amount is larger, the CPU subtracts the first subset from the amount. A divider in the CPU divides the remainder by the total value of the second subset. A multiplier multiplies the whole number quotient, of the division, by a tax amount. The resultant is entered into a register. A comparer and related circuitry compares the quotiant to a first and successive increments in the second subset until a successive one of the increments exceeds the remainder and stores the incremental tax values. In response to the exceeding increment, the CPU terminates the comparing operation and causes the device to indicate the stored, exact tax value.

6 Claims, 6 Drawing Figures

FIG.2.

| COLUMN 1 | COLUMN 2 | COLUMN 3 | COLUMN 4 | |
|---|---|---|---|---|
| FROM | TO | TAX | INCREMENT | |
| .01 | .14 | .00 | .14 | |
| .15 | .34 | .01 | .20 | |
| .35 | .59 | .02 | .25 | |
| .60 | .84 | .03 | .25 | |
| .85 | 1.14 | .04 | .30 | |
| 1.15 | 1.34 | .05 | .20 | |
| 1.35 | 1.59 | .06 | .25 | |
| 1.60 | 1.84 | .07 | .25 | |
| 1.85 | 2.14 | .08 | .30 | |
| 2.15 | 2.34 | .09 | .20 | |
| 2.35 | 2.59 | .10 | .25 | SUBSET A |
| 2.60 | 2.84 | .11 | .25 | |
| 2.85 | 3.14 | .12 | .30 | |
| 3.15 | 3.34 | .13 | .20 | |
| 3.35 | 3.59 | .14 | .25 | |
| 3.60 | 3.84 | .15 | .25 | |
| 3.85 | 4.14 | .16 | .30 | |
| 4.15 | 4.34 | .17 | .20 | |
| 4.35 | 4.59 | .18 | .25 | |
| 4.60 | 4.84 | .19 | .25 | |
| 4.85 | 5.12 | .20 | .28 | |
| 5.13 | 5.37 | .21 | .25 | SUBSET B |
| 5.38 | 5.62 | .22 | .25 | REPETITIONS OF SUBSET B |
| 5.63 | 5.87 | .23 | .25 | |
| 5.88 | 6.12 | .24 | .25 | |

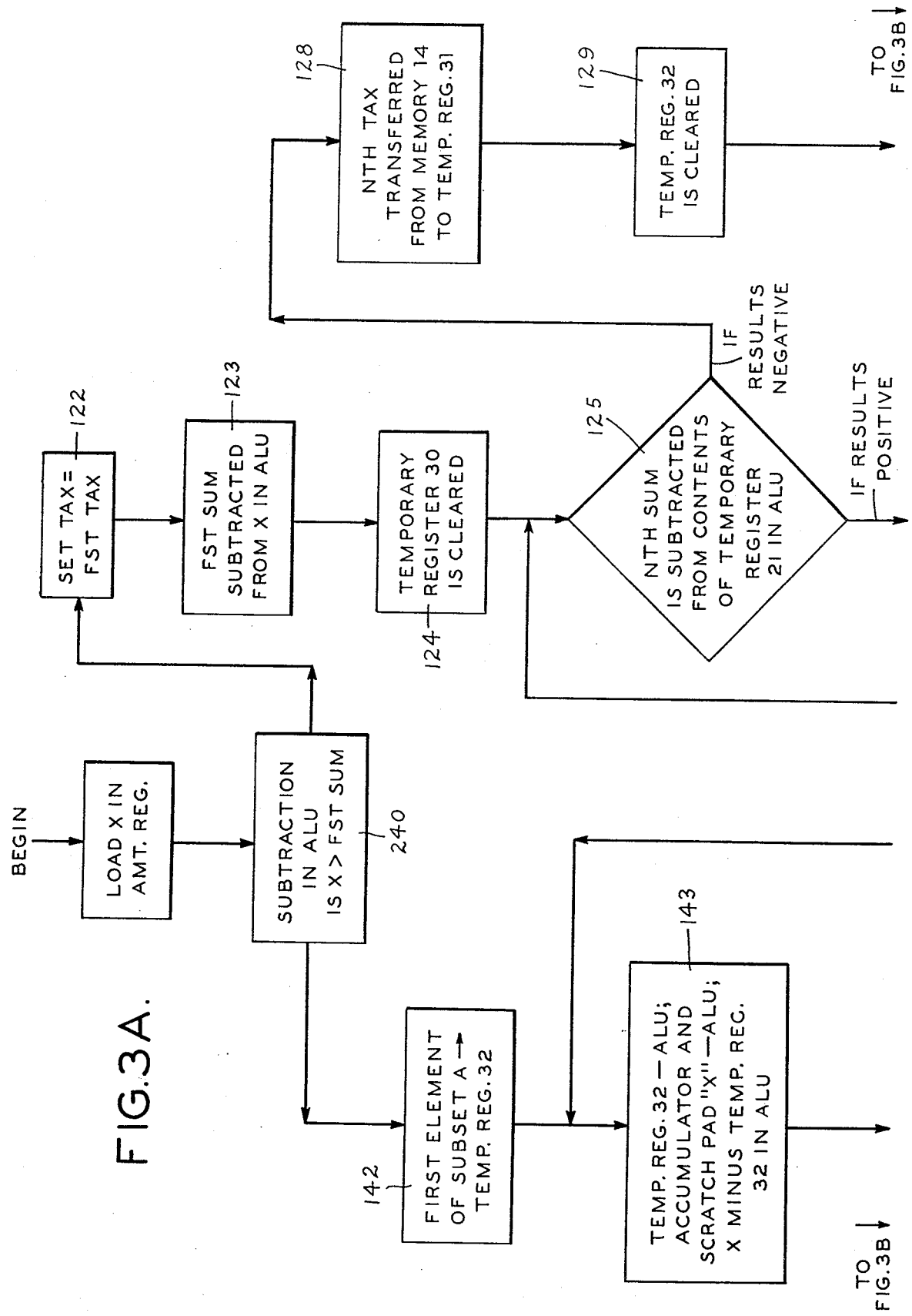

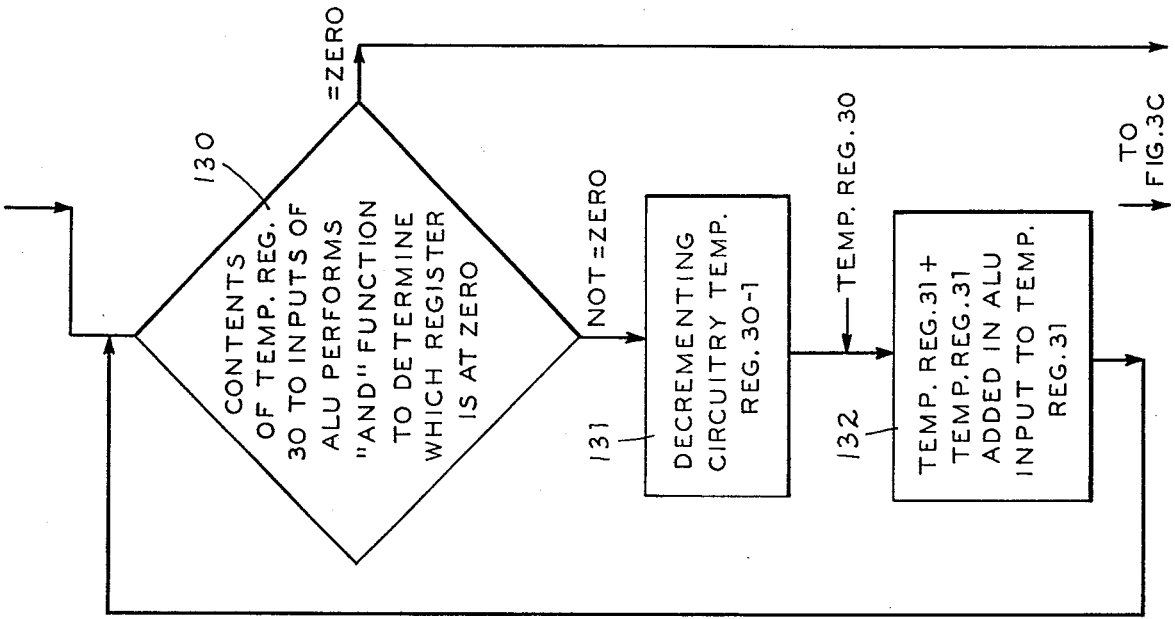
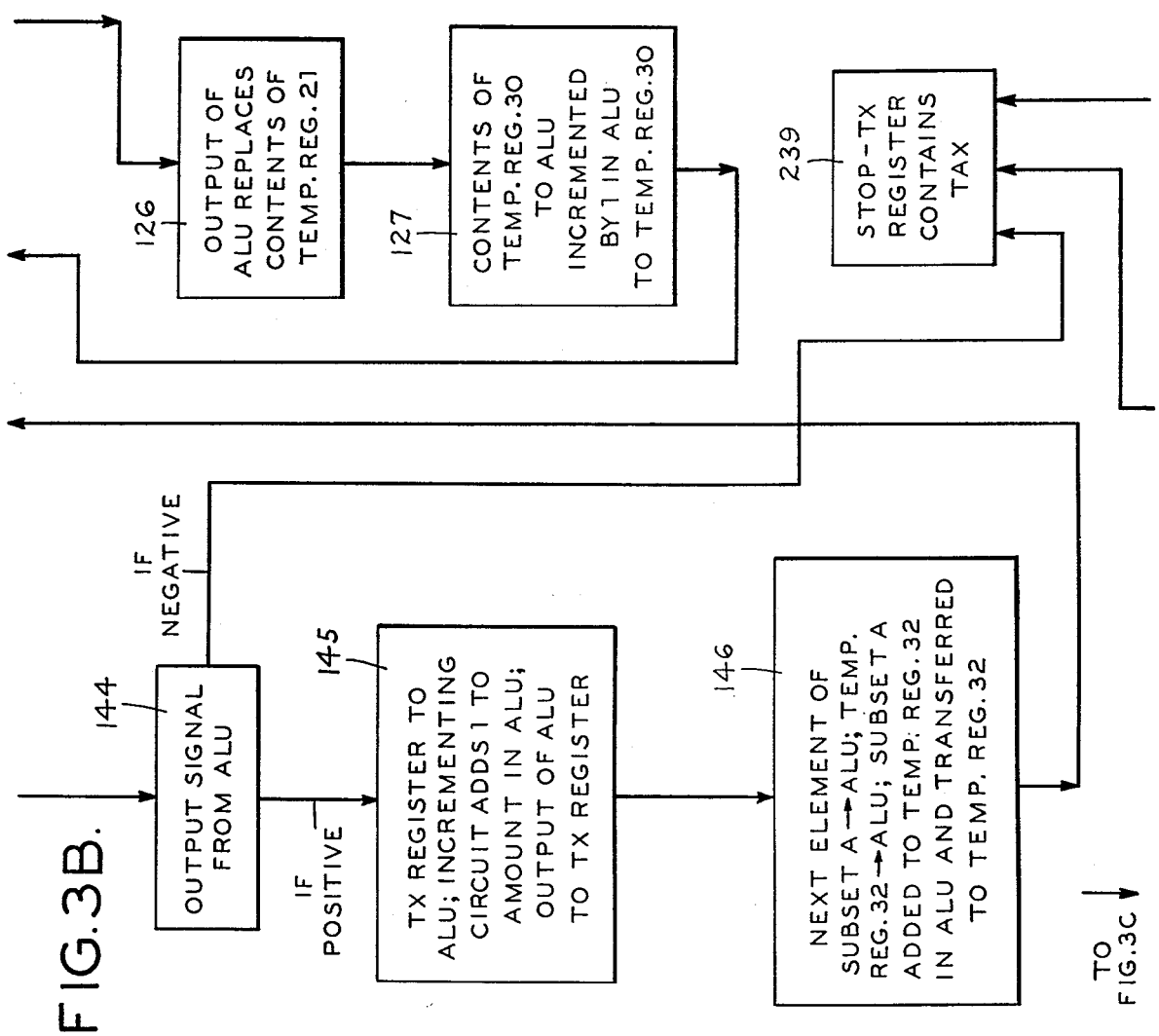
FIG.3B.

| COLUMN 1 | COLUMN 2 | COLUMN 3 | COLUMN 4 | |
|---|---|---|---|---|
| FROM | TO | TAX | INCREMENT | |
| .01 | .10 | .00 | .10 | } SUBSET A |
| .11 | .17 | .01 | .07 | ⎧ |
| .18 | .34 | .02 | .17 | ⎪ |
| .35 | .50 | .03 | .16 | ⎨ SUBSET B |
| .51 | .67 | .04 | .17 | ⎪ |
| .68 | .84 | .05 | .17 | ⎪ |
| .85 | 1.10 | .06 | .26 | ⎩ |
| 1.11 | 1.17 | .07 | .07 | ⎧ |
| 1.18 | 1.34 | .08 | .17 | ⎪ |
| 1.35 | 1.50 | .09 | .16 | ⎪ |
| 1.51 | 1.67 | .10 | .17 | ⎨ |
| 1.68 | 1.84 | .11 | .17 | ⎪ |
| 1.85 | 2.10 | .12 | .26 | ⎩ |
| 2.11 | 2.17 | .13 | .07 | ⎧ |
| 2.18 | 2.34 | .14 | .17 | ⎪ |
| 2.35 | 2.50 | .15 | .16 | ⎨ |
| 2.51 | 2.67 | .16 | .17 | ⎪ |
| 2.68 | 2.84 | .17 | .17 | ⎪ |
| 2.85 | 3.10 | .18 | .26 | ⎩ |
| 3.11 | 3.17 | .19 | .07 | ⎧ |
| 3.18 | 3.34 | .20 | .17 | ⎪ |
| 3.35 | 3.50 | .21 | .16 | ⎨ |
| 3.51 | 3.67 | .22 | .17 | ⎪ |
| 3.68 | 3.84 | .23 | .17 | ⎪ |
| 3.85 | 4.10 | .24 | .26 | ⎩ |
| 4.11 | 4.17 | .25 | .07 | ⎧ |
| 4.18 | 4.34 | .26 | .17 | ⎪ |
| 4.35 | 4.50 | .27 | .16 | ⎨ |
| 4.51 | 4.67 | .28 | .17 | ⎪ |
| 4.68 | 4.84 | .29 | .17 | ⎪ |
| 4.85 | 5.10 | .30 | .26 | ⎩ |
| 5.11 | 5.17 | .31 | .07 | ⎧ |
| 5.18 | 5.34 | .32 | .17 | ⎪ |
| 5.35 | 5.50 | .33 | .16 | ⎨ REPETITIONS OF SUBSET B |
| 5.51 | 5.67 | .34 | .17 | ⎪ |
| 5.68 | 5.84 | .35 | .17 | ⎪ |
| 5.85 | 6.10 | .36 | .26 | ⎩ |
| 6.11 | 6.17 | .37 | .07 | ⎧ |
| 6.18 | 6.34 | .38 | .17 | ⎪ |
| 6.35 | 6.50 | .39 | .16 | ⎨ |
| 6.51 | 6.67 | .40 | .17 | ⎪ |
| 6.68 | 6.84 | .41 | .17 | ⎪ |
| 6.85 | 7.10 | .42 | .26 | ⎩ |
| 7.11 | 7.17 | .43 | .07 | ⎧ |
| 7.18 | 7.34 | .44 | .17 | ⎪ |
| 7.35 | 7.50 | .45 | .16 | ⎨ |
| 7.51 | 7.67 | .46 | .17 | ⎪ |
| 7.68 | 7.84 | .47 | .17 | ⎪ |
| 7.85 | 8.10 | .48 | .26 | ⎩ |
| 8.11 | 8.17 | .49 | .07 | ⎧ |
| 8.18 | 8.34 | .50 | .17 | ⎪ |
| 8.35 | 8.50 | .51 | .16 | ⎨ |
| 8.51 | 8.67 | .52 | .17 | ⎪ |
| 8.68 | 8.84 | .53 | .17 | ⎪ |
| 8.85 | 9.10 | .54 | .26 | ⎩ |
| 9.11 | 9.17 | .55 | .07 | ⎧ |
| 9.18 | 9.34 | .56 | .17 | ⎪ |
| 9.35 | 9.50 | .57 | .16 | ⎨ |
| 9.51 | 9.67 | .58 | .17 | ⎪ |
| 9.68 | 9.84 | .59 | .17 | ⎪ |
| 9.85 | 10.50 | .60 | .26 | ⎩ |

FIG. 4.

METHOD AND APPARATUS FOR AUTOMATIC SALES TAX COMPUTATION

BACKGROUND OF THE INVENTION

This invention relates to business registers, and more particularly to systems for automatic computation of sales tax.

Collection of sales tax is a responsibility of most business in the United States. Many states provide for rigid auditing of sales tax records. Thus, it is necessary for businesses to collect exact amounts of sales tax in accordance with various states sales tax tables. Sales tax is commonly looked up on a chart by a cashier or salesperson in most cases. Certain amounts on state sales tax charts are listed next to an exact tax, higher amounts require calculation to be performed in addition to looking up a basic amount on the sales tax table. Even where a business is efficiently run with modern methods and automated equipment, it may be necessary to perform the time consuming and errorprone task of manual calculation and addition of sales tax. Errors in sales tax calculation cause both violation of the law, as well as possible loss of revenue to the retail establishment, since the retail establishment is held liable for sales taxes.

While prior systems for automatic calculation of sales tax have been provided, such as those included in computerized cash registers, such systems are quite complicated and may even prove to be errorprone. The typical automatic sales tax computation system which includes a memory into which an entire sales tax table is written, calculates a sales tax read from the memory for certain amounts and calculates sales tax as a straight percentage for higher amounts. An example in which this form of calculation may lead to error is seen in reference to the New Hampshire state sales tax table below.

| | |
|---|---|
| .01 – .15 | No. tax |
| .16 – .25 | .01 |
| .26 – .45 | .02 |
| .46 – .65 | .03 |
| .66 – .85 | .04 |
| .86 – 1.05 | .05 |
| 1.06 – 1.25 | .06 |

For taxable charges of over $1.25, the rate is one cent for each 20 cent increment, (5%).

This tax table requires collection of a 5 percent tax rate plus 1 cent for each 20 cents over $1.25. As an example, the tax on $1.46 is examined. A straight 5 percent of $1.46 is 7.3 cents or 7 cents tax. However, according to the chart, the tax on $1.25 is 6 cents plus 2 more cents since $1.46 is in the second 20-cent increment above $1.25. This results in a tax of 8 cents. Thus, a typical automatic sales tax calculator could produce an erroneous result.

Another method of computing taxes that would lead to errors with tax computation in certain states, is one where the computer operates on this basis - that there is a first group of points having successive cutoff values, for example $0.10, $0.35 and $0.78, and that all subsequent groups of cutoff values are the same as the first group with addition of whole dollar values. For example $1.10, $1.35, and $1.78 and so on. If the tax table for a particular state does not have a repeating pattern of this nature the system can not accurately calculate tax.

Automatic sales tax computers which must store an entire sales tax table in order to produce a direct result are unduly complicated and expensive. Sales tax calculators which are simplified to read out exact amounts below a certain cutoff level and provide a straight percentage thereafter may be erroneous.

SUMMARY OF THE INVENTION

It is therefore an object of the present invention to provide an automatic sales tax computation system in which a state, county, city, etc tax table is reduced to basic characteristics rather than a system which must create a sales tax table in a memory, using the same rules as the state sales tax table.

It is also an object of the present invention to provide a system of the type described which has lower storage requirements than a system storing an entire tax table, and which is consequently lower in cost to build.

It is a more specific object of the present invention to provide a method and apparatus for computing sales tax in which a table of increments in repeating ranges is provided describing the characteristics of a sales tax table, rather than in which data indicative of sales tax table per se is stored.

It is also an object of the present invention to provide a method and apparatus of the type described in which increments are algebraically computed from a taxable amount in order to calculate sales tax exactly.

Briefly stated, in accordance with the present invention, exact automatic computation of sales tax is provided rather than calculation of a percentage. A first range, or subset, of values for which there is a tax is stored in a memory. A second subset representing the cyclically repeating set of increments of "cents" values for which tax increases one unit per increment is also stored in the memory. The amount on which tax is to be calculated is entered in a register and compared to the total value of the first subset to determine if the amount is next divided by the total value of the second subset to obtain a whole number quotient, and the remainder quotient is repetitively compared to increments within the second subset to complete determination of the taxable amount.

BRIEF DESCRIPTION OF THE DRAWINGS

The means by which the foregoing objects and features of novelty are achieved are pointed out with particularity in the claims forming the concluding portion of the specification. The invention both as to its organization and manner of operation may be further understood with reference to the following drawings made in connection with the following description.

FIG. 2 is a sales tax chart of the state of Virginia annotated to demonstrate how a sales tax table is reduced to increments and subsets in accordance with the present invention.

FIG. 4 is a sales tax chart of the state of Pennsylvania annotated to demonstrate how a sales tax table is reduced to increments and subsets in accordance with the present invention;

DESCRIPTION OF THE PREFERRED EMBODIMENT

Figure 1:
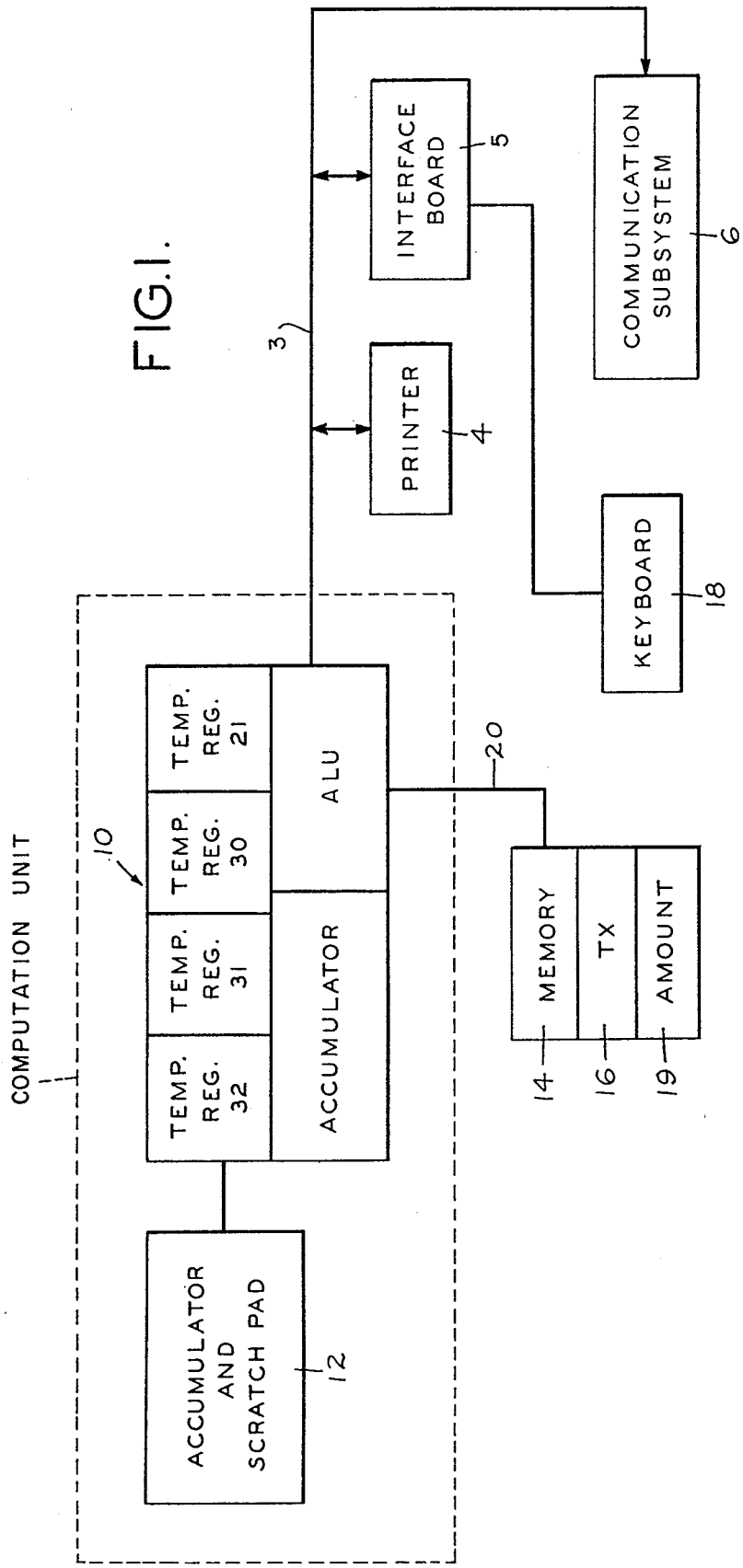
FIG. 1 is a block diagrammatic representation of a calculating system constructed in accordance with the present invention.

Referring now to FIG. 1, where is illustrated an automated cash register constructed in accordance with the present invention. A sales tax computation unit 2 is provided for totalizing sales and calculating and adding sales tax in accordance with the present invention. Other units are connected to the computation unit 2 by an input/output bus 3. These units may include a printer unit 4, interface board 5, and communication subsystem 6. The printer 4 is driven by the computation unit 2 in order to print sales receipts and other such data. The interface board 5 is connected to such units as a cashier-operated keyboard, cash drawers, any alarms and displays which show amounts being rung up. The communication subsystem 6 may include interconnections to a computer for checking credit card numbers, telephone interconnections to other data banks, and computer outputs for inventory control CPU 10 and registers 12 are known apparatus and may be located on a single IC chip. For example Intel 8008, Micro computer Itel data catalog, Feb., 1973. The printer, and communications subsystem are also all well known. For example Seiko AN 101F printer and Wester Electric 202C Modem communication subsystem.

The computation unit 2 includes a central processing unit (CPU) 10 which operates in a conventional manner in order to direct outputs to proper locations, access inputs as desired, and synchronize the order of operations. Part of the computation unit 2 is a accumulator and scratch pad register or working register bank 12. This is interconnected to a memory 14, including register 16. Memory 14 is loaded with the characteristics of a sales tax table in accordance with the present invention. The portion of memory 14, designated 16 and 19 includes registers AMT and TX for respectively storing numbers indicative of the taxable amount and the computed tax. The central processing unit (CPU) 10 has access to each of the registers in the working register bank 12, the registers 16 and the memory 14.

Referring now to FIG. 2 which is typical sales tax table, particularly that of the state of Virginia, columns 1, and 2 list upper and lower values of sales tax brackets. Column 3 corresponds to tax values falling between those listed in columns 1 and 2, and column 4 is a chart showing increments equal to the amount necessary to be added to the amount in column 1 (previous line) to cause the tax to increase by 1 cent. The present invention recognizes that there are repetitive cycles of increments in each sales tax table and reduces a given sales tax table into basic characteristics for storage accordingly. A first subset A of increments is created corresponding to that set of increments which do not repeat. In the present example, the subset A includes many increments, which are not repeating and on which there is a tax. It will be appreciated that subset A could include only one increment and have no tax on that increment. Subset B is the subset of increments in a range in which tax increases as opposed to the non repetitive character of subset A. In the particular example there is only one increment in subset B, its value being $0.25. Subset B includes one increment, the sales tax increasing one cent each time that increment is added to a base amount. Consequently, the entire sales tax table is reduced to a few characteristics, namely the first set of increments that do not repeat subset A and the repetitive elements of subset B.

This differs from the prior art in that in the prior art an entire tax was generally stored up to a certain amount or else assumed that the entire table has a single repeating pattern. If it does not have a single repeating pattern throughout then the entire table must be stored. This requires extensive storage. However, the present invention, by using subset A and the repeating increments of subset B avoids extensive storage.

With subset A and subset B the following information is determined: a first sum (FSTSUM) which is the sum of all elements in subset A, a first tax (FSTFAX) which is the tax to be collected on that amount, an Nth sum which is the sum of all elements in subset B, and Nth tax (NTHTAX) the amount of additional tax collected for each addition of Nth sum to the amount FSTSUM, all of which are stored in memory 14.

Another example is the Pennsylvania tax table which is shown in FIG. 4. In that table, subset A (non-repetitive) includes only one value (which has no tax) and subset B, a repeating cycle of 6 values.

Figure 3C:
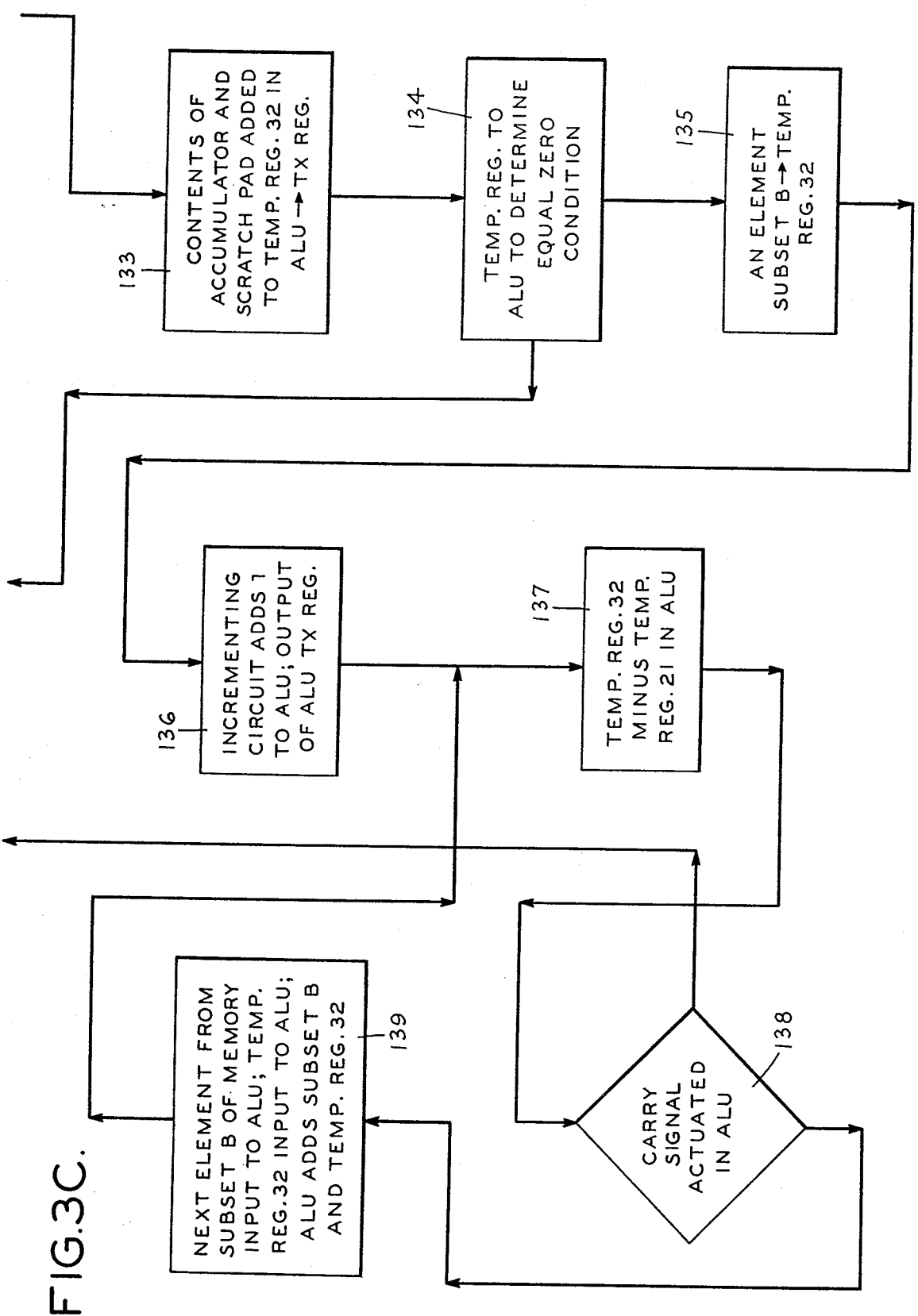
FIG. 3 A–C is a flow chart of the method of the present invention performed by the apparatus of the present invention.

Reference may be had to FIG. 3 in conjunction with the following description. A taxable AMT X is located in the AMT register 19. This AMT X is computed by the ALU in CPU 10. The input to the ALU consists of a number of partial sums from the memory 14. The sums are derived from amounts input to the keyboard 18 which amounts represent purchases. The keyboard 18 causes the CPU 10 to access the memory 14 and transfer data from the memory to the accumulator and scratchpad memory 12. At this point the taxable amount register is accessed (the register is initially cleared to zero) and the amount accessed is input to a temporary register in the CPU 10. It is input to the ALU (as an augend and the contents of the scratch pad memory 12 is also input to the ALU as an addend). The two are then added in the ALU and the output is then transferred over bus 20 to the AMT register 19. The AMT register 19 now contains the taxable amount on the amounts input to the keyboard 18 (the purchases). The procedure is repeated after each additional amount is input to the keyboard 18 until all the purchases from the particular customer have been completed. It is understood that the term keyboard is meant to include optical mark readers, push button type keys and any other data input device. At this point the TX register 16 is cleared.

X is now transferred to the accumulator and scratch pad 12 of the computation unit 2 through a data bus 20. The FSTSUM is then transferred to the temporary register of the CPU 10. Both X and the FSTSUM are input to the ALU and subtracted. If the FSTSUM is greater than X the carry bit output of the ALU will be positive and if the FSTSUM is less, then the carry bit output of the ALU will be zero (240 in FIG. 3).

Now describing the operation when the carry bit is zero (the operation when the carry bit is positive will be described hereinafter), the FSTTAX is accessed from memory 14 and input via bus 20 to the accumulator and scratch pad 12. The contents of TX register 16 (which is initially zero) are transferred from the TX register 16 to Temporary register 21. From the temporary register 21 the contents are input to the ALU along with the FSTTAX from accumulator and scratch pad 12. The sum of this addition is then output to the TX register 16 over data bus 20, (as indicated by 122 in FIG. 3).

X is now transferred to accumulator and scratch pad 12 via data bus 20. The FSTSUM is then transferred from the memory 14 to the temporary register 21. From the temporary register 21 the FSTSUM is input to the ALU along with X from the accumulator and scratch pad 12. The FSTSUM is then subtracted from X and the difference is output from the ALU to temporary register 21 (This is shown by box 123 in FIG. 3).

A second temporary register 30 is then cleared (Box 124). NTHSUM is transferred from the memory 14 to accumulator and scratch pad 12. The contents of temporary register 21 (X minus FSTSUM) is input to the ALU along with NTHSUM from the scratch pad and the accumulator 12. If the output of the ALU, which is the difference between the NTHSUM and the contents of the temporary register 21 where the latter is subtracted from the former) is positive (Box 125) the result output of the ALU replaces the contents of temporary register 21 (Box 126 of FIG. 3) The contents of the second temporary register 30 are transferred to the ALU. Once in the ALU an incrementing circuit (not shown) increments the amount by 1. This is then output from the ALU to temporary register 30 where it replaces the contents of that register (Box 127). The same procedure (boxes 125–127) starting with the transferring of the NTHSUM from memory 14 to accumulator and scratch pad 12 is repeated until such time as the output of the ALU (Box 125) becomes negative. In essence a division has been effected by a repeated subtraction (Boxes 124–127). The quotient of this division is now in temporary register 30 and the remainder (which is what is left from the repeated subtractions) remains in temporary register 21.

The NTHTAX is now transferred from memory 14 to temporary register 31 (Box 128). Temporary register 32 is cleared (Box 129).

The contents of temporary register 30 are gated to both inputs of the ALU. The ALU performs "and" function on the inputs. It puts the inputs through and logic circuitry (not shown) which if both inputs are zero the output signal "equals zero" will be positive. It is noted that both inputs are always the same in this function. This function permits an indication whether register 30 is at zero without altering the contents if the contents were not zero (Box 130).

If the equal zero output is not positive (the contents of temporary register 30 do not equal zero) the contents of temporary register 30 is presented to the input of the ALU and decrementing circuitry (not shown) within the ALU representing the input of the ALU minus one replaces the contents of temporary register 30.

The contents of temporary register 31 is input to one input of the ALU and the contents of the temporary register 32 are input to the other input of the ALU. They are added together in the ALU and the output of the ALU represents the sum of these inputs. This sum replaces the previous contents of the register 32 (Box 132). The sequence (Boxes 130–132) starting with presenting contents of temporary register 30 to both inputs of the ALU is repeated until such time as the equal zero output signal becomes positive. In essence, a multiplication has been effected by repeated addition (Boxes 130–132)

This multiplication has yielded the product of NTHTAX times the whole number quotient of the taxable amount minus the first sum divided by NTHSUM. The contents of TX register 16 are then transferred over data bus 20 and thence to accumulator and scratch pad 12. The contents of accumulator and scratch pad 12 are presented to one input of the ALU at the same time as the contents of temporary register 32 are input to the other input of the ALU. These inputs are summed within the ALU and that sum (the output) is input to TX register 16 along bus 20. (It replaces the previous contents of that register). (Box 133).

Now the contents of temporary register 21 is presented to both inputs of the ALU. The test equal zero condition of the inputs is performed in the manner same as previously described, (Box 134).

If the equal zero signal output of the ALU is positive, the TX register contains the amount of the tax to be paid. This completes the tax operation. This tax is then used in subsequent calculation in the cash register as mentioned previously.

If the Equal zero is not positive indicating that the inputs to the ALU were other than zero, the first element of subset B is accessed from memory 16 (the various elements of subset B are positioned separately in the memory). The element is then transferred over data bus 20 to temporary register 32, (Box 135). The tax is accessed from TX register 16 and transferred along data bus 20 and thence to accumulator and scratch pad 12. The contents of accumulator and scratch pad 12 are now transferred to the ALU. An incrementing circuit as previously discussed now adds "1" to the amount in the ALU.

The output of the ALU is now transferred to the TX register 16, where it replaces the previous contents (Box 136).

The contents of temporary register 32 are presented to one input of the ALU, while the contents of temporary register 21 are presented to the other input of the ALU. The two inputs are then subtracted in the ALU (Temporary registers 32–21) Box 137) as a result of the subtraction a carry signal will be actuated in the ALU (Box 138). If this signal is nonpositive then the value in the TX register 16 is the amount of tax to be collected.

If the signal is positive the next element of Subset B is accessed from memory 16 and input to accumulator and scratch pad 12, and further presented to one input of the ALU. The contents of temporary register 32 are simultaneously input to the other input of the ALU. The two inputs are added by the ALU and the output is transferred to and replaces the previous contents of temporary register 32 (Box 139).

The process of Boxes 136–139 are continued until the signal output of the ALU (Box 138) is non positive. When it is non positive the amount in TX register 16 (Box 239) is the amount of tax to be collected.

Now referring back to the situation where the carry bit output of the ALU is positive (Box 140). In this situation the first element of subset A in the memory 14 is accessed and input via data bus 20 to the temporary register 32 (Box 142). From there it is presented to one input of the ALU while simultaneously the contents of accumulator and scratch pad 12, which is X, is presented to the other input of the ALU, the two are then subtracted in the ALU, (X minus the contents of temporary register 32), (Box 143).

If the output carry signal resulting from the subtraction is non positive, this indicates that there is no carry present and therefore no tax. The TX register 16 has remained at zero which reflects this. No tax will be collected for this transaction.

In this case (when the carry signal is positive) the tax is accessed from TX register 16 and transferred along data bus 20 and thence to accumulator and scratch pad 12. The contents of accumulator and scratch pad 12 are presented to the ALU. An incrementing circuit as previously described now adds "1" to the amount in the ALU. The output of the ALU is then transferred to the TX register 16 where it replaces the previous contents (Box 145).

The next element of Subset A is accessed from memory 16 and input to accumulator and scratch pad 12 and further presented to one input of the ALU. The contents of temporary register 32 are simultaneously input to the other input of the ALU. The two inputs are added in the ALU and the output is transferred to and replaces the previous contents of temporary register 32 (Box 146).

The process of Boxes 143–146 are continued until the signal output of the ALU (Box 144) is non positive. When it is non positive the amount in TX register 16 is the amount of tax to be collected.

A programmed general purpose computer is disclosed which computes taxes by dividing a tax table into two subsets with no requirement for a particular pattern in either subset so that exact amounts of tax can be readily calculated.

The present invention results in greatly simplified novel apparatus. The memory 14 is provided for storing a minimal number of characteristics described above which can be used to resolve any taxable amount (to the capacity of the cash register) for tax computation. It is not necessary as in prior apparatus to provide a memory large enough to store an entire tax table. The memory 14 may comprise a ferrite cores ROM solid state read only memory, plated wire memory or other memory suseptible of construction on a matrix card. Consequently, matrix cards may be substituted to provide characteristics of tax tables for different jurisdictions. The present invention lowers the cost of a matrix card. Apparatus operation is also simplified because a number X minus FSTSUM may be divided to resolve the number into sales tax components. Continual incremental comparisons to a sales tax table, need not be performed through the entire number.

Of course, many departures may be made from the specifics of the invention illustrated here consistent with the above teachings in order to provide automatic sales tax computation in accordance with the present invention.

I claim:

1. An automatic sales tax computer comprising, in combination
   an amount register for storing a signal indicative of a taxable amount;
   a tax register for storing a signal indicative of an amount of tax;
   a memory for selectively providing a signal indicative of a first sum equal to the upper limit of a first range of values, a signal indicative of a second sum equal to a second range of values greater than said first range of values, and signals respectively indicative of successive increments within said first and second ranges of values;
   means for accessing the first sum from said memory for comparison to the number in said amount register and for providing a zero output to the tax register when the amount is less than said first sum and for subtracting the first sum from the amount when the amount is greater than the first sum;
   means for accessing the second sum from said memory and for dividing the remainder thereby; and
   multiplication means for multiplying the whole number quotient of the aforesaid division by a tax amount and entering the result in said tax register, and means for comparing the quotient in sequence to a first increment within the second range and the sum of the first increment and successive increments accessed from said memory and means coupled for incrementing the signal in the tax register for each increment accessed from said memory, and means responsive to the aforesaid comparison for terminating further accessing of increments from the memory when the sum of the first increment and successive increments exceeds the remainder, whereby a signal indicative of the exact tax on the taxable amount is provided in the tax register.

2. An automatic sales tax computer according to claim 1 wherein said memory is provided with further storage locations for providing signals indicative of successive increments in the first range and further comprising means responsive to a comparison indicating a taxable amount less than said first sum for initiating a comparison of the taxable amount to a first increment in the first range and successive comparison to the sum of the first increment and successive increments, and means for incrementing the signal in the tax register for each increment beyond a pre-selected increment, and comparison means for terminating accessing of increments from said memory when the sum of the first increment and successive increment exceeds the signal indicative of the taxable amount.

3. An automatic sales tax computer according to claim 1 wherein said memory is provided including means for providing a first signal indicative of a first range in one increment.

4. An automatic sales tax computer according to claim 3 wherein said first range is selected to correspond to a value of zero to a number corresponding to a highest value of a sales tax range on which there is no tax, and including means in said memory for providing the first signal when addressed by an address indicative of the first range.

5. An automatic sales computer according to claim 4 wherein the second range is selected to begin at the value of the first taxable amount and said memory is provided storing increments corresponding to amount for which tax increases one cent.

6. An automatic sales tax computer according to claim 5 further comprising means for displaying the number indicated by the signal in said tax register.

* * * * *